Oct. 29, 1968  L. M. O. CYMBALISTY  3,407,972
APPARATUS FOR DISCHARGING PARTICULATE SOLIDS FROM A VESSEL
Filed Feb. 1, 1967  2 Sheets-Sheet 1

INVENTOR
LUBOMYR M. O. CYMBALISTY

BY Beale and Jones
ATTORNEYS

INVENTOR
LUBOMYR M.O. CYMBALISTY
BY Beale and Jones
ATTORNEYS

United States Patent Office 3,407,972
Patented Oct. 29, 1968

3,407,972
APPARATUS FOR DISCHARGING PARTICULATE SOLIDS FROM A VESSEL
Lubomyr M. O. Cymbalisty, Edmonton, Alberta, Canada, assignor of thirty percent each to Cities Service Athabasca, Inc., a corporation of Delaware, Imperial Oil Limited, a corporation of Canada, Atlantic Richfield Corporation, a corporation of Pennsylvania, and ten percent to Royalite Oil Company, Limited, a Canadian corporation
Filed Feb. 1, 1967, Ser. No. 613,359
15 Claims. (Cl. 222—193)

ABSTRACT OF THE DISCLOSURE

An apparatus for facilitating the discharge of relatively dry solids from the lower end of a vessel which, in its upper portion, may contain a liquid. The relatively dry material passes through an outlet partially obstructed by a member which vibrates at a certain frequency axially of the outlet and which moves at a lower frequency transversely of the outlet.

*Background of the invention*

This invention pertains to a method and apparatus for facilitating the discharge of particulate solids through an outlet in a vessel. In one environment, this invention may be used for discharging solids from a vessel which contains both solids and liquids in a manner that will minimize the loss of liquids when the solids are removed.

A frequent problem which has received the attention of prior practitioners in this art is the "bridging" which occurs at the discharge outlet of a vessel such as a hopper. The particulate materials builds up across the outlet to create a blockage which prevents the further discharge of materials.

Various approaches have been used to prevent "bridging." One such approach is to shape the outlet portion of the vessel in a manner which will facilitate flow of the particulate solids. Another solution involves the vibration of the vessel which induces enough agitation to deter stoppage of the outlet flow. Still another approach is the provision of a vibrating or oscillating member at the outlet in the manner shown by U.S. Patent 767,591 which issued on Aug. 16, 1904, to William E. Nickerson.

The prior art devices, while they do prevent "bridging" of the vessel's contents at the outlet, are not particularly well suited for systems where the particulate solids are relatively dense and contain an appreciable amount of liquid. In such an environment, the present invention has been found to be ideally suited since it provides both for a reduction of the moisture in the discharged materials and for the elimination of bridging at the outlet opening.

*Summary of the invention*

This invention relates to a method and apparatus which promotes the discharge of particulate solids from a vessel. The nature of this invention renders it particularly useful when discharging solids from a vessel which contains, in its upper portions, a substantial amount of liquid which is not to be discharged through the outlet of the vessel; however, it also is useful when dealing with vessels containing only dry particulate material.

A particular environment to which the invention is suited is in the apparatus for extracting petroleum products from tar sand deposits such as those existing in the vicinity of the Athabaska River in the Province of Alberta, Canada. In such apparatus, there are vessels called hot water separators which contain the sand, oil and other materials. After the oil is removed from the sand in a processing vessel of this type, the sand is discharged through an outlet in the lower portion of the vessel. The oil and water are removed through another outlet. Of course, it is desired to have a low moisture content in the removed sand in order to facilitate its handling and prevent the loss of oil. By employment of this invention, it is possible to achieve results meeting these requirements.

With this summary in mind, it will be appreciated that a principal object of this invention is to provide a method and apparatus which will prevent the bridging or blocking in the discharge outlet of a vessel containing wet or dry solid particulate material.

Another object of the invention is to provide a method and apparatus which will minimize the liquid content of the material discharged from a vessel containing both liquid and solid particulate material.

Still another object is to provide a method and apparatus which will densify particulate material as it is being discharged from a vessel.

Another object is to provide a method and apparatus which is relatively simple to construct and operate, yet which will produce results superior to those devices known in the prior art.

This invention contemplates the location of a member or obstruction adjacent the outlet of the vessel containing the particulate material. This member is vibrated at a frequency in the range of 5,000–12,000 cycles per minute along the central axis of the outlet. Simultaneously, it is vibrated at a lower frequency in directions transverse to the outlet. This latter frequency is preferably in the range of 400 to 1000 cycles per minute. The axial vibration serves to densify the mass of particulate matter, bringing the particles closer together and in effect squeezing the liquid out of the particulate mass. Transverse vibrations, since they are of a lesser frequency, do not appreciably densify the mass of particulate matter, but they do continuously compact and release the mass against the walls of the outlet to facilitate discharge of the materials.

The present invention may be used to advantage in many types of apparatus and it may assume many forms and modifications which adapt it to its surroundings. Only two embodiments are disclosed herein.

*Description of the drawing*

Referring to FIG. 1, it will be seen that the vessel 2 has at its lower portion an outlet 4 which is defined by downwardly and inwardly tapered walls 6. Within these walls 6 there is an obstruction 8 which is in a position to obstruct partially the flow of material passing through the outlet 4. The obstruction itself is an upwardly pointed conical body which has its upper surface 10 sloping downwardly and outwardly from the apex 12. The location of the obstruction 8 is such that it is surrounded horizontally by the inwardly tapered walls 6 of the lower portion of the vessel 2.

Figure 1:
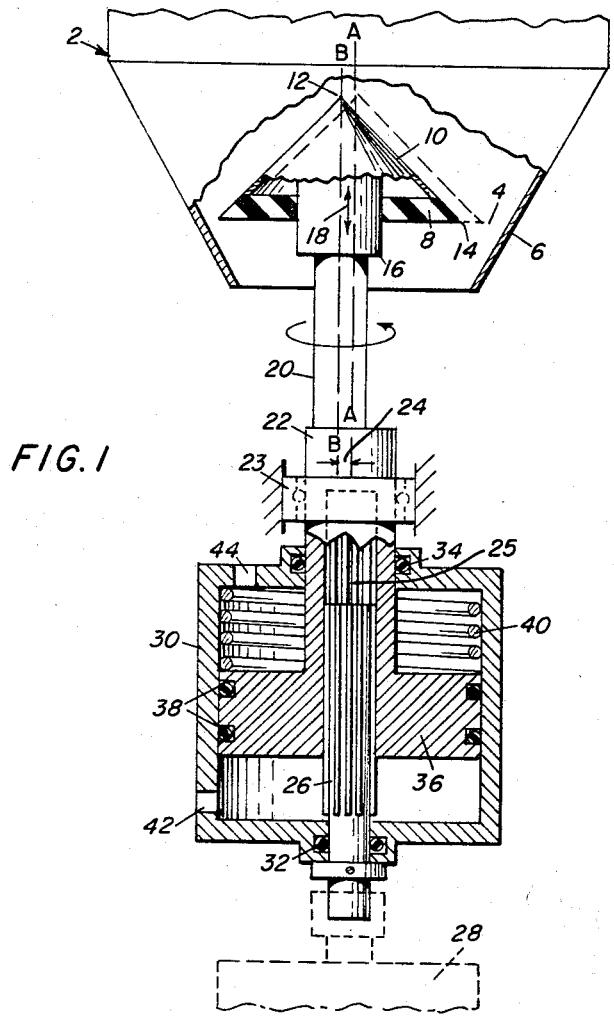
FIG. 1 is a side elevation, partially in section of a first embodiment of the invention. In this device, an upwardly pointed conical obstruction is located in the hopper outlet. Movement of the obstruction in a direction axial of the outlet is induced by a vibrator located at the obstruction; and transverse movement of the obstruction is achieved by rotating it about an offset vertical axis.

The obstruction member 8 has a twofold purpose. It operates as a valve member since, when it is moved downwardly from the position illustrated in FIG. 1, its lower peripheral edge 14 will seal against the inner side of the tapered walls 6 of the vessel, thus closing off the flow of material through the outlet 4. The second purpose of the obstruction is to densify and facilitate flow of the particulate solid material through the outlet portion 4. The exact manner in which this is accomplished is described below.

Immediately adjacent to the obstruction 8, there is a vibrating means 16 of any well known suitable type which produces vibrations with components of movement aligned with the vertical arrow 18. These vibrations have a frequency of 5,000 to 12,000 cycles per minute which may be selectively varied by any known control means. Within this range, it has been found that there is a densification of the solid particulate material above the obstruction 8. When there is substantial amount of water or other fluid present in the vessel 2, this densification causes the solid particles to move closer to each other and reduce the sizes of the spaces which formerly were occupied by liquid. The liquid is thus "squeezed" out of the mass of solid particles so that there is a substantially dry material passing through the outlet 4. Although termed "substantially dry," the weight of the removed liquid may be as much as 25% of the weight of the removed solids. It will be noted that the motion in the direction indicated by arrows 18 is axially aligned with the outlet portion 4 of the vessel.

It should be mentioned that the employment of vertical vibrations and control means for varying the frequency of the vertical vibrations has particular advantages when the vessel 2 contains a liquid with the particulate materials. Variation of this frequency will, of course, have an effect on the location and extent of the interphase where solids are suspended in the liquid. Thus, an operator may adjust the frequency in order to increase the vertical extent of the interphase so the liquid will more effectively perform its action on the particulate materials. In apparatus for removing oil from tar sands by the use of hot water, an increase in the extent of the interphase will permit a more thorough cleansing of the sand by the hot water and produce a more complete removal of the oil from the sand.

Additionally, any variation in the frequency of vertical vibrations will affect the size of the particles which remain suspended in the liquid. This permits the operator to select a frequency within which certain selected lighter solids will remain suspended in the liquid so that they will not pass through the outlet opening 4 of the vessel.

The obstruction 8 and the vibrating means 16 are supported at the upper end of a rotating shaft 20 which is connected at its lower end to a hollow piston rod 22. The piston rod is rotated in fixed bearings 23 at from 400 to 1,000 revolutions per minute about an axis A—A which is centrally and axially aligned with the outlet 4 of the vessel 2. The central axis B—B of the shaft 20 is substantially parallel to and slightly offset a distance 24 from the axis A—A so that rotation of the hollow piston rod 22 will cause an eccentric rotation or horizontal gyration of the obstruction means 8. The distance 24 is exaggerated in the drawings for purposes of illustration.

The hollow piston rod 22 has a splined interior 25 which receives the projecting flutes or splines on a driving shaft 26. The driving shaft extends downwardly to a point where it is connected to a drive motor diagrammatically illustrated at 28. The speed of the drive motor may be adjusted within the prescribed range by any suitable control means. It will be understood that rotation of the drive motor 28 causes movement of the driving shaft 26 which is transmitted to the hollow piston rod 22 and the eccentrically mounted rotating shaft 20. This results in relative movement between the walls 6 of the vessel and the obstruction 8 to create a condition in the outlet portion 4 wherein there is a continual application and release of pressure on the particulate material passing through the outlet portion 4. In this manner, the flow of material through the outlet is promoted. In order to prevent undesired horizontal densification of the particulate mass, the frequency of the transverse movements is less than the frequency of the axially aligned vibrations produced by the vibrating means 16.

In order to perform its valving function, the obstruction means 8 may be moved vertically a distance appreciably greater than the small amplitude of the vibrations produced by the vibrating means 16. This latter movement may be produced by the piston and cylinder arrangement illustrated in FIG. 1. The cylinder 30 is maintained in a position fixed with respect to the drive motor 28. Seals 32 and 34 prevent leakage from the interior of the cylinder around the driving shaft 26 and the hollow piston rod 22 respectively. A piston 36 with seals 38 is located interiorly of the cylinder 30. A helical spring 40 biases the piston 36 downwardly toward a position where the obstruction 8 will close the outlet 4 of the vessel.

Fluid openings 42 and 44 lead from points below and above the piston 36 in the cylinder 30. These openings lead to control means (not shown) which selectively admit fluid to the interior of the cylinder 30 in order to produce whatever movement is desired in the piston 36. Downward movement of the piston 36 tends to close the outlet portion 4 of the vessel, while upward movement provides a larger outlet opening in order to increase the discharge rate.

The operation of the apparatus of FIG. 1 will be apparent from the foregoing discussion. The size of the outlet openings 4 is governed by the vertical positioning of the obstruction member 8. This positioning is accomplished by action of the piston 36 and cylinder 30 which produce vertical movement in the hollow piston rod 22, the shaft 20 and the obstruction 8. When the obstruction member 8 is in a position which permits flow of material through the outlet portion 4, there are constant vertical vibrations produced in the obstruction member 8 by the vibrating means 16. Simultaneously, the obstruction 8 is rotated about the eccentric axis A—A so that it moves in a horizontal circular gyratory path. The axial or vertical vibrations densify the particulate material approaching the outlet and thus reduce the amount of liquids entrained in the exiting mass of particulate material. The transverse or horizontal vibrations resulting from the rotation of the obstruction 8 promote the flow of material through the outlet portion 4 by continually compressing and releasing this material.

Figure 2:
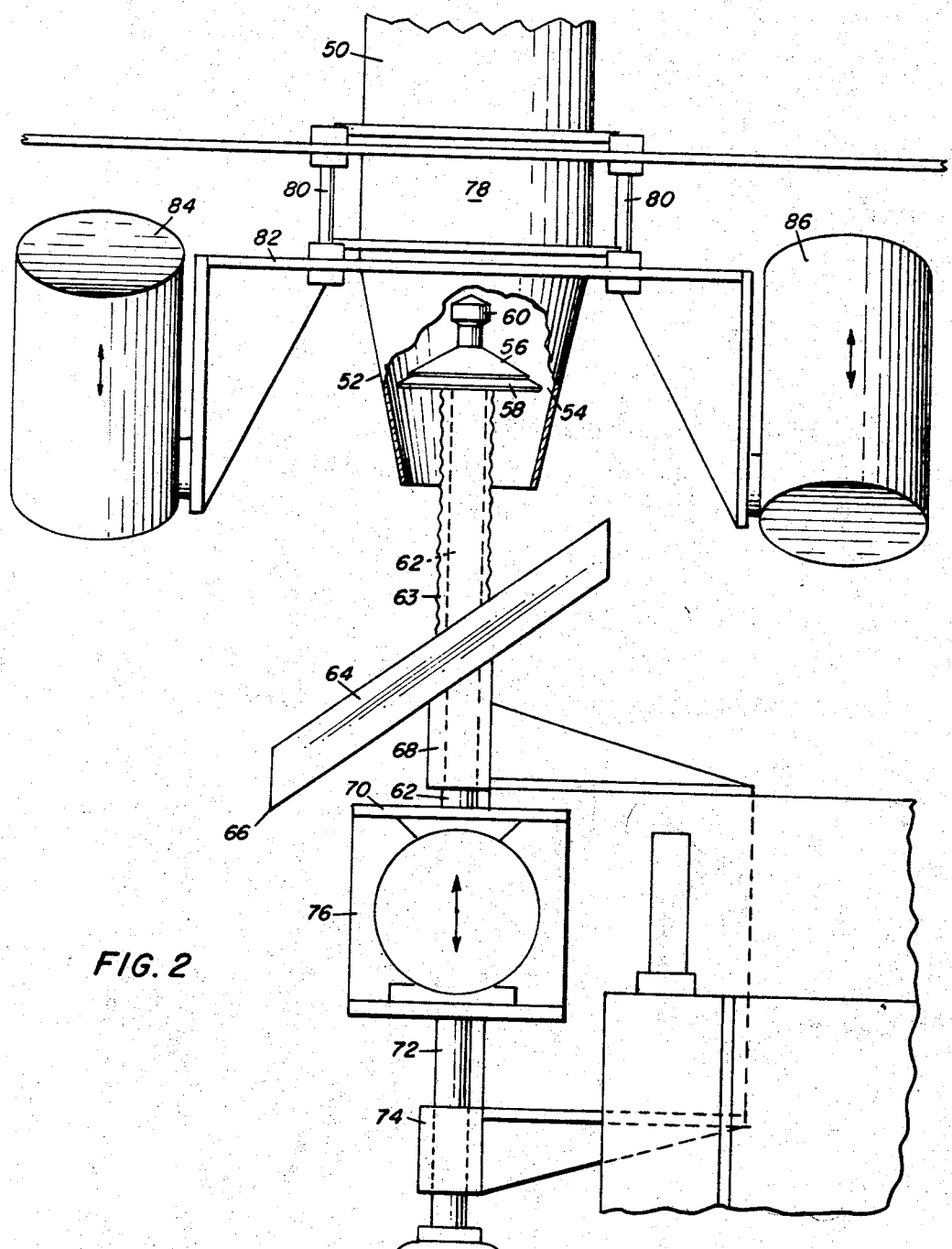
FIG. 2 is a side elevation, partially in section, of a second embodiment of the invention. Vertical vibrations of the obstruction are imparted by a device attached to its actuating shaft. Relative horizontal movement occurs between the obstruction and the outlet due to gyratory motion which is induced in the outlet portion of the vessel.

This same general principle of material handling is present in the embodiment illustrated in FIG. 2. In this apparatus, the vessel 50 has a lower portion 52 with downwardly and inwardly tapered walls which define an outlet portion 54. Located within and being horizontally surrounded by the lower portion 52 of the vessel is an obstruction member 56 with a resilient peripheral rim 58. As in the FIG. 1 embodiment, the upper wall of the obstruction member 56 is sloped downwardly and outwardly to promote flow of the particulate material toward the outlet. Above the sloping wall is a projection 60 for introducing a flushing liquid into the particulate mass in a manner more fully described in the ensuing discussion of FIG. 3. The obstruction in this embodiment is mounted on a shaft 62 which is surrounded by a flexible sleeve 63. The shaft 62 passes through a trough or chute 64 which is sloped so that the material flowing through the outlet 54 will eventually be discharged at 66. The flexible sleeve 63 is secured with suitable seals to the upper surface of the chute 64 so that discharged particulate materials will not pass through the opening around the shaft 62 in the chute 64.

Immediately beneath the chute and rigidly attached thereto is a stationary sleeve 68 which slidably receives the shaft 62. A housing 70 is rigidly attached to the lowermost end of the shaft 62.

The means in this embodiment for producing the vertical vibrations of the obstruction 56 is the vibrator 76 which is mounted within the housing 70. This vibrator is a mechanical one well known in the art in which weights are rotated about eccentric axes. This type of vibrator requires a mechanical input from a rotating shaft 72 located below the housing 70 and connected to a driving member 73 by a flexible coupling 75. As in the preceding embodiment, the frequency of these vibrations axially aligned with the outlet 54 are from 5,000 to 12,000 cycles per minute.

In this latter embodiment, the horizontal or transverse displacement between the obstruction and the lower portion 52 of the vessel is produced by moving the lower portion 52 while maintaining the obstruction 56 in a position which is fixed horizontally. Gyration of the lower portion 52 of the vesel is possible since the portion 78 immediately thereabove is made of flexible material. The lower portion of the vessel 52 is suspended by a plurality of rods 80 which are attached to the main body of the vessel 50 at their upper ends and to a member 82 at their lower ends. Member 82 is connected to the upper edge of the lower portion 52 of the vessel. The rods 80 are mounted in a manner so that the lower portion 52 of the vessel is capable of moving in a gyratory path.

The means for producing the gyratory movement of the lower portion 52 of the vessel comprises a pair of inclined vibrating devices 84 and 86 which produce vibrations so phased that there is an imbalance in the suspended system including the lower portion 52 of the vessel. The movement so produced will, as in the FIG. 1 embodiment, have a frequency which is in the 400 to 1,000 cycle per minute range. Thus, the effects of the movement imparted to the obstruction 56 are identical to those which occur in the FIG. 1 embodiment.

Figure 3:
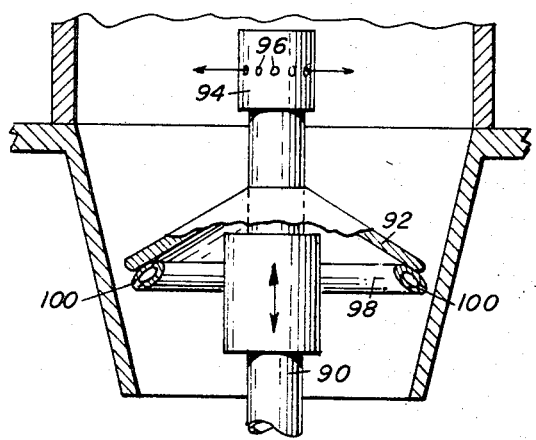
FIG. 3 illustrates a modified form of obstruction means in which flushing orifices are provided to promote the discharge of materials.

Of course, when solid particulate materials such as sand are densified to drive out water, they become less capable of passing through an outlet in a vessel. This creates problems which are in many instances corrected by the relative transverse movement between the obstruction and the outlet walls. In some instances, however, it becomes necessary to introduce liquid into the dense mass of particulate material in order to promote flow through the outlet. One manner of accomplishing this is illustrated in FIG. 3. There, the shaft 90 which supports the obstruction 92 is hollow and communicates with the interior of a fluid head 94 which is located above the sloped wall of the obstruction 92. The fluid head 94 has a plurality of openings 96 which discharge the fluid into the particulate mass. This naturally makes it more flowable and promotes its discharge. Also assisting in this respect is the tubular ring 98 which lies beneath the periphery of the obstruction 92. This ring 98 is also in communication with the hollow center of the rod 90, and it has a series of outwardly directed jets 100 which will direct fluid into the particulate material being discharged.

While it is recognized that the introduction of flushing fluid by apparatus such as illustrated in FIG. 3 will complicate the handling of the discharged sands in some instances, it will be appreciated that it also improves the efficiency of the apparatus. In systems for extracting oil from tar sands, the use of a fluid head 94 and fluid ring 98 will increase the moisture content of the discharged sand, but it will reduce the amount of usable oil which would pass with the sand through the outlet of the vessel. On the other hand, the introduction of the flushing fluid will expel some of the oil upwardly to promote its separation from the sands.

From the foregoing description, it will be appreciated that there is presented a most useful and efficient apparatus for the discharge of solid particulate material from a vessel. Numerous modifications may be made while remaining within the scope of the invention. The invention is not limited only to the specific embodiments shown, but it fully encompasses all modifications, substitutions and improvements which fall within the terms and the spirit of the following claims.

I claim:
1. Apparatus for discharging solid materials, comprising:
   (a) a vessel having a lower portion with an outlet through which materials are discharged,
   (b) obstruction means located adjacent to the lower portion of the vessel in a position to obstruct partially the flow of material through said outlet,
   (c) means vibrating said obstruction means in directions having components axially aligned with said outlet at a given frequency,
   (d) means producing relative movement transverse to the axis of said outlet between said obstruction means and said lower portion of the vessel, which relative movement has a frequency less than said given frequency, and
   (e) means mounted on said obstruction means for introducing a flushing liquid into that portion of the vessel adjacent the obstruction means.

2. Apparatus according to claim 1 having means for rotating said obstruction means about a substantially vertical axis which is unequally spaced from peripheral portions of the obstruction means in order to produce the aforementioned relative movement.

3. Apparatus according to claim 1 in which the means vibrating said obstruction means produces vibrations in the range of 5,000 to 12,000 cycles per minute.

4. Apparatus according to claim 3 having means for varying the frequency of the means vibrating the obstruction means within the specified frequency range.

5. Apparatus for discharging solid materials, comprising:
   (a) a vessel having a lower portion with an outlet through which materials are discharged,
   (b) obstruction means located adjacent the lower portion of the vessel in a position to obstruct partially the flow of material through said outlet,
   (c) means vibrating said obstruction means in directions having components axially aligned with said outlet at a given frequency, and,
   (d) means producing relative movement transverse to the axis of said outlet between said obstruction means and said lower portion of the vessel, which relative movement has a frequency less than said given frequency,
   (e) the axis of said outlet being substantially vertical, said outlet being defined by a downwardly and inwardly tapering wall which has portions horizontally displaced from and surrounding said obstruction means,
   (f) the means producing relative movement between the obstruction means and the lower portion of the vessel producing relative movement at a frequency of from 400 to 1000 cycles per minute,
   (g) the means vibrating said obstruction means producing vibrations in the range of 5,000 to 12,000 cycles per minute.

6. Apparatus according to claim 5 having mutually independent means for varying the frequency of the means vibrating the obstruction means and the means producing relative movement.

7. Apparatus according to claim 5 in which said obstruction means has an upper surface which is sloped downwardly and outwardly.

8. Apparatus for discharging solid materials, comprising:
   (a) a vessel having a lower portion with an outlet through which materials are discharged,
   (b) an obstruction means located within the lower portion of the vessel and spaced horizontally from the walls thereof to obstruct partially the flow of material through the outlet, said obstruction means being symmetrical about its central axis, (c) means for rotating said obstruction means about an axis spaced from and substantially parallel to said central axis, and (d) means vibrating said obstruction means in directions having components axially aligned with said outlet at a given frequency.

9. Apparatus according to claim 8 in which said given frequency is greater than the frequency of rotation of said obstruction means.

10. Apparatus according to claim 8 in which said given frequency is from 5,000 to 12,000 cycles per minute.

11. Apparatus according to claim 10 in which said obstruction means rotates at a frequency of from 400 to 1000 revolutions per minute.

12. Apparatus according to claim 11 having mutually independent means for varying said given frequency and the frequency of rotation.

13. Apparatus for discharging solid particulate materials from a vessel containing liquid and solid particulate materials, said apparatus comprising:

(a) a vessel having a lower portion with an outlet through which materials are discharged;

(b) obstruction means located adjacent the lower portion of the vessel in a position to obstruct partially the flow of material through said outlet;

(c) means vibrating said obstruction means in directions having components axially aligned with said outlet at a given frequency, (d) means at said outlet for introducing flushing liquid into a zone adjacent said obstruction means, and (e) means producing relative movement transverse to the axis of said outlet between said obstruction means and the lower portion of the vessel, said relative movement having a frequency less than said given frequency.

14. Apparatus according to claim 13 in which said given frequency is from 5,000 to 12,000 cycles per minute.

15. Apparatus according to claim 14 in which the transverse movement of said obstruction means is at a frequency of from 400 to 1000 cycles per minute.

References Cited

UNITED STATES PATENTS

| | | | |
|---|---|---|---|
| 1,566,746 | 12/1925 | Herman | 222—404 X |
| 1,597,207 | 8/1926 | Molander | 241—214 X |
| 1,761,240 | 6/1930 | Smith | 222—404 X |
| 2,569,085 | 9/1951 | Wood et al. | 222—200 |
| 2,886,334 | 5/1959 | Presler | 222—200 X |
| 3,099,138 | 7/1963 | Hightower et al. | 222—200 X |
| 3,138,335 | 6/1964 | Vessels. | |
| 3,166,222 | 1/1965 | Schrader | 222—195 |
| 3,178,068 | 4/1965 | Dumbaugh | 222—161 |
| 3,339,808 | 9/1967 | Sterns | 222—196 |

SAMUEL F. COLEMAN, *Primary Examiner.*

K. N. LEIMER, *Assistant Examiner.*